June 7, 1932.  E. B. CROCKER  1,862,008
INDEX ADJUSTING MEANS
Filed Aug. 14, 1931  2 Sheets-Sheet 1
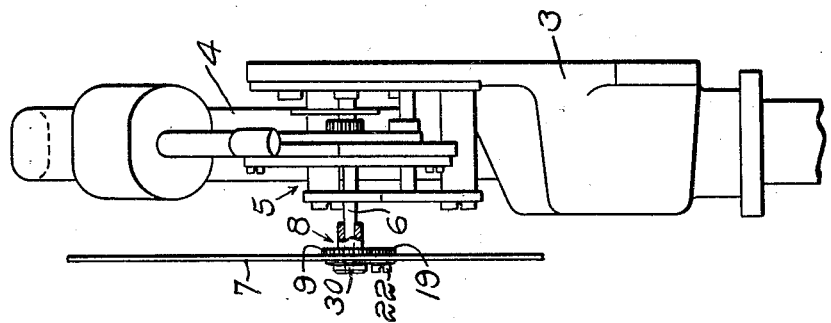
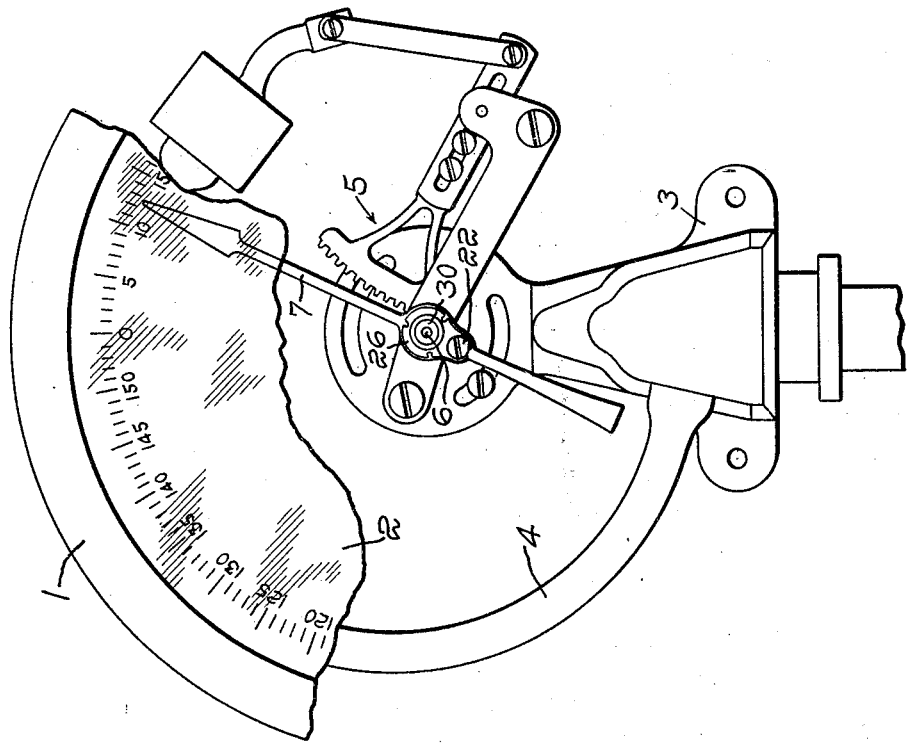
Inventor:
Ernest B. Crocker
by Roberts Cushman + Woodberry
Attys.

June 7, 1932.  E. B. CROCKER  1,862,008
INDEX ADJUSTING MEANS
Filed Aug. 14, 1931  2 Sheets-Sheet 2
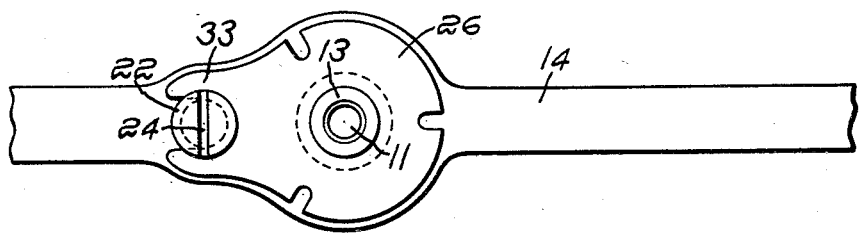
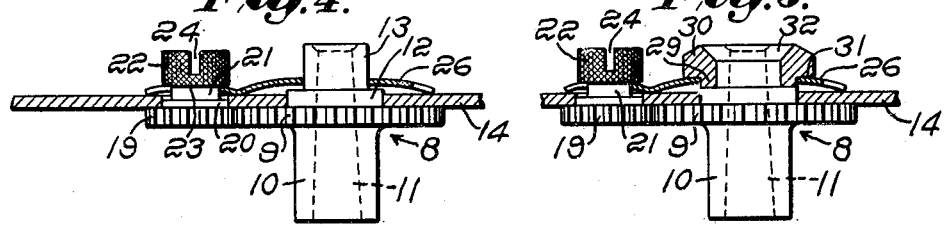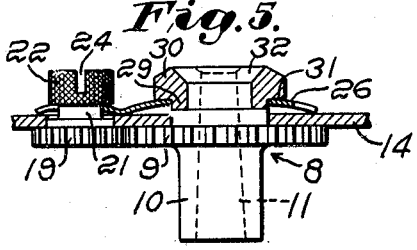
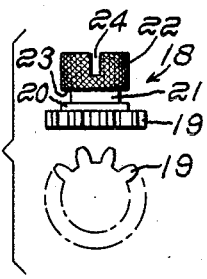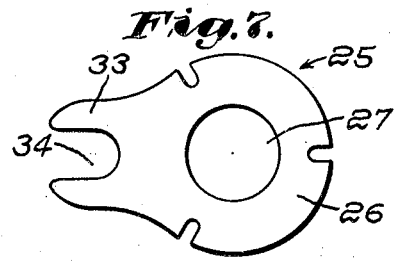
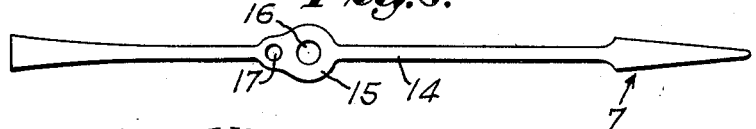
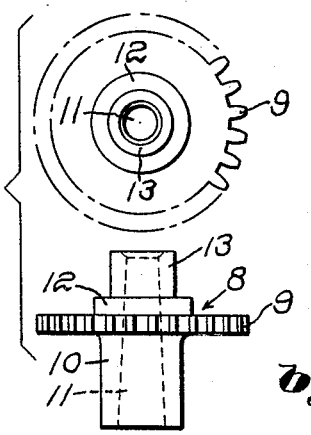
Inventor.
Ernest B. Crocker
by Roberts, Cushman & Woodbury
Attys.

Patented June 7, 1932

1,862,008

UNITED STATES PATENT OFFICE

ERNEST B. CROCKER, OF STRATFORD, CONNECTICUT, ASSIGNOR TO CONSOLIDATED ASHCROFT HANCOCK COMPANY, OF NEW YORK, N. Y., A CORPORATION OF DELAWARE

INDEX ADJUSTING MEANS

Application filed August 14, 1931. Serial No. 557,084.

This invention relates to index adjusting means useful, for example, in a pressure gauge or similar instrument having a hand, pointer, or index mounted upon a staff and usually cooperating with a graduated dial. Devices of this kind commonly include moving parts of comparatively delicate construction, so that even though the index or pointer may be carefully adjusted by the manufacturer, the shocks and vibrations incident to transportation of the instrument and its installation at its ultimate place of use tend to throw the index out of proper adjustment so that resetting is necessary. Adjustment may also be necessitated by wear of the parts through long use. Moreover, in certain instances, gauges or similar instruments are installed where they are subject to a constant operating factor in addition to the variable factor which is to be measured, and it then becomes desirable to set the index so as to eliminate the constant factor. Other examples might well be cited to illustrate the desirability, and in many cases the necessity of adjusting the index with reference to its staff, but accurate adjustment of these parts is not easy.

While it may be possible to bend the index and thus obtain small adjustments of at least approximate accuracy, such a method of procedure gives the instrument an unsightly appearance, and is not applicable to large adjustments. On the other hand, the removal of the index from its staff, without danger of bending the index or injury to the mechanism, requires the use of special tools, and its replacement so as to obtain the desired accuracy of adjustment is difficult, requires care and skill, and at best may necessitate repeated trials before the proper result is reached.

In accordance with the present invention, the desired adjustment may be made with the greatest accuracy and very easily without removing the index from its staff and without imposing injurious stress upon the index, the staff, or the actuating parts, all by the use of simple means, for example an ordinary screw driver. This desirable result is obtained by securing the index proper to the staff through intermediate connections, including parts capable of relative movement, preferably of micrometer dimensions, and in the provision of simple means adapted to hold such relatively movable parts firmly and reliably in adjusted position.

In the accompanying drawings one desirable embodiment of the invention has been illustrated by way of example, and in the drawings:

Fig. 1 is a front elevation, partly broken away, illustrating the invention as applied to a Bourdon tube pressure gauge of a well known type;

Figure 2 is a side elevation of the gauge movement of Fig. 1, omitting the outer case and dial;

Fig. 3 is a fragmentary plan view to larger scale, illustrating the central part of the index or pointer and the adjusting means partly assembled therewith;

Fig. 4 is fragmentary side elevation of the parts shown in Fig. 3;

Fig. 5 is a view similar to Fig. 4 but showing the completed assembly;

Fig. 6 is a composite view illustrating the side elevation and in bottom plan, respectively, the adjusting pinion and its actuating element;

Fig. 7 is a plan view of the adjustment-retaining spring;

Fig. 8 is a side elevation of the spring of Fig. 7;

Fig. 9 is a plan view of the pointer or index before assembly with the adjusting elements; and Fig. 10 is a composite view illustrating in plan and side elevation, respectively, the adjusting gear which is carried by the index staff and supports the index.

Referring to Figs. 1 and 2 wherein the invention is illustrated by way of example as embodied in a Bourdon tube pressure gauge, the numeral 1 designates the outer casing of the gauge and 2 indicates the dial. The base 3, which is fixed to the casing in usual manner, carries the Bourdon tube 4 and the gauge movement 5, including the index staff 6. This gauge movement may be of any usual type providing for transmitting minute movements of the Bourdon tube to the index staff. In accordance with the present invention the index 7 is not mounted directly upon the index staff according to the usual custom, but is carried by a support 8 illustrated in detail in Figs. 4, 5, and 10.

This support may conveniently be made from a suitable length of pinion rod of the proper diameter, and comprises the gear 9, preferably provided with hub portions extending from its opposite faces. The lower hub portion 10 is provided with a bore 11, preferably tapered and adapted to fit onto the end of the index staff 6, the parts when so assembled ordinarily remaining in relatively fixed position during the life of the gauge. The bore 11 may extend throughout the entire length of the support 8 or may be confined to the lower hub portion 10 as desired. The upper hub portion comprises the pivot member 12 adapted to form a pivotal support for the index as hereinafter described, and an extension 13 of smaller diameter than the pivot portion 12.

The index 6 may be made from sheet metal or other suitable material and usually comprises the elongate and relatively narrow portion 14 and the central enlargement 15, the latter being provided with a journal opening 16 adapted to fit over the pivot member 12 of the support so as to turn upon the latter, and being provided with the second journal opening 17 for the reception of the adjusting device 18 (Fig. 6).

This adjusting device 18 may also conveniently be made from pinion rod of the proper diameter and comprises the toothed pinion 19 which is in constant mesh with the gear 9 when the parts are assembled. The adjusting member 18 also comprises the pivot portion 20 of a smaller diameter than the pinion 19 and adapted to turn in the journal opening 17 in the index. The member 18 is also preferably furnished with the portion 21 of a diameter smaller than that of the part 20, above which is the head 22 of a diameter slightly smaller than that of the part 20, and providing the overhanging shoulder 23. The head 22 may be furnished with a slot 24 for the reception of a screw driver and/or may have its outer surface knurled or roughened to facilitate its rotation by the thumb and finger if desired. In assembling the parts, the head 22 of the adjusting member may be passed upwardly through the opening 17 in the index, and the adjusting member is then held in position by means of the retaining device 25 (Figs. 7 and 8).

This retaining device is in the nature of a spring washer, consisting of resilient sheet metal stamped to the proper shape and contour and comprising the portion 26 which is dished upwardly and which has the central opening 27, which, when assembled with the support, is concentric with the axis of the bore 11. This opening receives a cylindrical portion 29 of a collar 30 having an overhanging shoulder 31 bearing against the part 26, and being conveniently retained in assembled position by riveting over the upper end of the extension 13 as shown at 32. The collar when thus assembled furnishes a substantial surface to receive the blows or pressure of a tool or appliance for forcing the support 8 onto the staff.

The retaining member 25 is provided with a lateral forked arm 33 providing the recess 34 which receives the part 21 of the adjusting member 18. The part 33 is also dished upwardly, and when the parts are assembled the part 33 bears frictionally against the shoulder 23 of the adjusting device so that it not only retains the latter in assembled relation but opposes rotation of the adjusting device, and thereby tends to retain the latter securely in adjusted position.

The ratio of the gear 9 and the pinion 19 is such, for example one to five, that a substantial angular movement of the pinion 19 about its own axis affects but a relatively small angular movement of the index 6 about the axis of the index staff. By the use of a pinion and gear of the proper ratio, it is readily possible to obtain an adjustment of the index of micrometer proportions without any tendency to deform or unduly stress the index or the gauge movement. When the adjustment has been made, as for example by turning the device 18 by means of a screw driver inserted in the slot 24, the parts are retained securely in adjusted position by the action of the spring washer device 25 so that it is not necessary to loosen or tighten any parts preliminary to or subsequent to the actual adjustment.

The device thus provided is simple in character, very cheap and easy to construct and apply, is applicable to existing gauges, or other indicating instruments without substantial change in the latter except a possible replacement of the index, and when once installed permits accurate and ready adjustment of the index to any desired extent without danger of damage and without requiring any unusual skill on the part of the operator, it being noted that the constant pressure exerted by the resilient member 25 reliably retains the parts in adjusted position even though subject to constant vibration.

While certain desirable arrangements have been illustrated by way of example, we wish it to be understood that the invention is not necessarily limited to the exact size, proportion of parts or gear ratio here illustrated, and that while certain parts have been shown as of integral construction, they may be made of a plurality of assembled elements if preferred, old within the spirit of the invention as defined by the appended claims.

I claim:

1. The combination with an index staff and an index, of intermeshing gear members for angularly adjusting the index relatively to the staff, and a friction member tending at all times to prevent relative movement of the gear members.

2. The combination with an index staff and a relatively movable index, of a gear fixed relatively to the staff, a pinion having a shaft portion journalled in the index, said pinion constantly meshing with the gear, the pinion having a portion provided with a slot for the reception of an adjusting tool, and a friction spring bearing against a portion of the pinion to hold the latter in adjusted position.

3. A device of the class described comprising a support having a bore for the reception of an index staff, and having a pivot element substantially concentric with the axis of said bore, the support having a relatively fixed gear concentric with its axis, an index pivotally mounted on said pivot element, an actuating pinion journalled in said index and meshing with the gear, and means for turning the pinion.

4. A device of the class described comprising a support adapted to be mounted upon an index staff, said support having a pivot element, an index mounted on said pivot element to swing relatively to the support, the index having an opening therein, a pinion having a shaft journalled to turn in said opening, friction means tending to prevent rotation of the pinion, and a gear fixed to the support, said gear meshing with the pinion and being of a diameter substantially greater than that of the pinion.

5. A device of the class described comprising a support having a tapered bore adapted to receive an index staff, said support having a pivot element concentric with the axis of the bore, an index having a journal opening for the reception of said pivot element and being adapted to swing relatively to the support, the index having a second journal opening spaced from the first, an adjusting device having a shaft journalled in said latter opening, said device comprising a pinion, a gear fixed to the support meshing with said pinion, and a friction spring pressing against a part of the adjusting device and tending to hold said device in adjusted position.

6. A device of the class described comprising a support having a hub portion provided with a bore for the reception of an index staff, a gear fixed to the support at the upper end of the hub portion, a pivot portion above the gear, and a shoulder member above the pivot portion, an index having an opening which receives the pivot portion of the support, whereby the index may swing relatively to the support, the index having a second opening spaced from the first, an adjusting device carried by the index, said device being rotatable relatively to the index and having a pinion meshing with the gear and the support, the adjusting device also having a peripheral shoulder, and a spring secured in position by engagement with the shoulder member of the support and frictionally pressing against the shoulder of the adjusting device, thereby tending to hold the latter against rotation.

7. A device of the class described comprising a support having a hub portion provided with a bore for the reception of an index staff, a gear fixed to the support at the upper end of the hub portion, a pivot portion above the gear, and a shoulder member above the pivot portion, an index having an opening which receives the pivot portion of the support, whereby the index may swing relatively to the support, the index having a second opening spaced from the first, an adjusting member having a shaft portion journalled in said second opening and having a pinion meshing with the gear on the support, the adjusting member also having a shoulder disposed above its shaft portion, and a spring having an opening concentric with the axis of the support and having a bowed portion held under compression between the index and the shoulder member of the support, said spring having a laterally extending forked end receiving the shaft portion of the adjusting member and frictionally engaging said member, whereby to oppose turning of the latter.

8. A device of the class described comprising a support having a bore for the reception of an index staff, a gear fixed to the support and concentric with the axis of said bore, an index mounted to swing about the axis of said bore, and a pinion meshing with the gear on the support, and means for turning the pinion about its own axis.

9. A device of the class described comprising a gear having a hub portion provided with a bore for the reception of an index staff, said hub having a pivot portion, an index mounted to turn the said pivot portion, the support also having an extension of smaller diameter than the pivot portion thereof, a collar mounted on said extension, the collar having an overhanging circumferential shoulder, the end of the extension being riveted over to secure the collar in place, a spring washer interposed between said shoulder and the index, and an index adjusting device comprising a pinion engaging the gear, the spring washer having a portion frictionally engaging a part of the adjusting device and tending to hold the latter in adjusted position.

Signed by me at Bridgeport, Conn., this 10th day of August, 1931.

ERNEST B. CROCKER.